(12) United States Patent
Clem et al.

(10) Patent No.: US 11,334,840 B1
(45) Date of Patent: *May 17, 2022

(54) SYSTEMS AND METHODS FACILITATING SHIPPING SERVICES RATE RESALE

(71) Applicant: Stamps.com, El Segundo, CA (US)

(72) Inventors: John Roland Clem, Manhattan Beach, CA (US); Pradipe Yoggi, Sylmar, CA (US)

(73) Assignee: Stamps.com Inc., El Segundo, CA (US)

( * ) Notice: Subject to any disclaimer, the term of this patent is extended or adjusted under 35 U.S.C. 154(b) by 127 days.

This patent is subject to a terminal disclaimer.

(21) Appl. No.: 16/812,086

(22) Filed: Mar. 6, 2020

Related U.S. Application Data

(60) Continuation of application No. 15/607,215, filed on May 26, 2017, now Pat. No. 10,628,778, which is a
(Continued)

(51) Int. Cl.
*G06Q 10/08* (2012.01)
*G06Q 30/06* (2012.01)
*G06Q 20/12* (2012.01)

(52) U.S. Cl.
CPC .......... *G06Q 10/083* (2013.01); *G06Q 20/12* (2013.01); *G06Q 30/0641* (2013.01)

(58) Field of Classification Search
CPC ... G06Q 10/083; G06Q 30/0641; G06Q 20/12
See application file for complete search history.

(56) References Cited

U.S. PATENT DOCUMENTS

| 3,584,696 A | 6/1971 | Eblowitz |
| 3,594,727 A | 7/1971 | Braun |

(Continued)

FOREIGN PATENT DOCUMENTS

| CA | 2470371 A1 * | 5/2003 | ......... G07B 17/0008 |
| EP | 0137737 A2 | 4/1985 | |

(Continued)

OTHER PUBLICATIONS

Stamps.com introduces PC postage 8.5: [1]. (2009). Internet Business News, Retrieved from https://www.proquest.com/trade-journals/stamps-com-introduces-pc-postage-8-5/docview/190875986/se-2?accountid=14753 (Year: 2009).*

(Continued)

*Primary Examiner* — Ashford S Hayles
(74) *Attorney, Agent, or Firm* — Norton Rose Fulbright US LLP

(57) ABSTRACT

Systems and methods which provide a shipping service resale platform enabling single shipper account access to multiple shipping service rate schedules are disclosed. Shipping service rate optimization is facilitated for a shipper using a single shipper account of embodiments of the invention, whereby the shipper is enabled to utilize rates available from various rate schedules, such as may include reseller negotiated rates, shipping service provider published rates, etc., according to embodiments. The shipper is enabled to establish, manage, and maintain a single shipper account for use in purchase and payment of shipping services which implicate different shipping service provider payment mechanisms, different shipping service resellers, and/or different shipping service providers.

17 Claims, 7 Drawing Sheets

Related U.S. Application Data division of application No. 14/055,473, filed on Oct. 16, 2013, now Pat. No. 9,721,225.

(56) References Cited

U.S. PATENT DOCUMENTS

| | | |
|---|---|---|
| 3,691,726 A | 9/1972 | Stephens et al. |
| 4,119,194 A | 10/1978 | Freeman et al. |
| 4,253,158 A | 2/1981 | McFiggans |
| 4,376,299 A | 3/1983 | Rivest |
| 4,511,793 A | 4/1985 | Racanelli |
| 4,641,347 A | 2/1987 | Clark et al. |
| 4,725,718 A | 2/1988 | Sansone et al. |
| 4,743,747 A | 5/1988 | Fougere et al. |
| 4,744,554 A | 5/1988 | Kulpa et al. |
| 4,757,537 A | 7/1988 | Edelmann et al. |
| 4,763,271 A | 8/1988 | Field |
| 4,775,246 A | 10/1988 | Edelmann et al. |
| 4,800,506 A | 1/1989 | Axelrod et al. |
| 4,802,218 A | 1/1989 | Wright et al. |
| 4,812,994 A | 3/1989 | Taylor et al. |
| 4,831,554 A | 5/1989 | Storace et al. |
| 4,831,555 A | 5/1989 | Sansone et al. |
| 4,837,701 A | 6/1989 | Sansone et al. |
| 4,858,138 A | 8/1989 | Talmadge |
| 4,864,618 A | 9/1989 | Wright et al. |
| 4,868,757 A | 9/1989 | Gil |
| 4,873,645 A | 10/1989 | Hunter et al. |
| 4,893,249 A | 1/1990 | Silverberg |
| 4,900,903 A | 2/1990 | Wright et al. |
| 4,900,904 A | 2/1990 | Wright et al. |
| 4,900,941 A | 2/1990 | Barton et al. |
| 4,901,241 A | 2/1990 | Schneck |
| 4,908,770 A | 3/1990 | Breault et al. |
| 4,941,091 A | 7/1990 | Breault et al. |
| 5,058,008 A | 10/1991 | Schumacher |
| 5,065,000 A | 11/1991 | Pusic et al. |
| 5,067,088 A | 11/1991 | Schneiderhan |
| 5,075,862 A | 12/1991 | Doeberl et al. |
| 5,077,792 A | 12/1991 | Herring |
| 5,085,470 A | 2/1992 | Peach et al. |
| 5,111,030 A | 5/1992 | Brasington et al. |
| 5,150,407 A | 9/1992 | Chan |
| 5,202,834 A | 4/1993 | Gilham |
| 5,222,018 A * | 6/1993 | Sharpe ................ G06Q 20/102 705/30 |
| 5,233,657 A | 8/1993 | Gunther |
| 5,237,506 A | 8/1993 | Horbal et al. |
| 5,239,168 A | 8/1993 | Durst, Jr. et al. |
| 5,289,540 A | 2/1994 | Jones |
| 5,319,562 A * | 6/1994 | Whitehouse ....... G07B 17/0008 705/403 |
| 5,323,323 A | 6/1994 | Gilham |
| 5,323,465 A | 6/1994 | Avarne |
| 5,341,505 A | 8/1994 | Whitehouse |
| 5,423,573 A | 6/1995 | de Passille |
| 5,454,038 A | 9/1995 | Cordery et al. |
| 5,483,445 A | 1/1996 | Pickering |
| 5,485,369 A * | 1/1996 | Nicholls .......... G06Q 10/06311 705/7.13 |
| 5,490,077 A | 2/1996 | Freytag |
| 5,510,992 A | 4/1996 | Kara |
| 5,583,779 A | 12/1996 | Naclerio et al. |
| 5,602,743 A | 2/1997 | Freytag |
| 5,606,507 A | 2/1997 | Kara |
| 5,606,613 A | 2/1997 | Lee et al. |
| 5,612,541 A | 3/1997 | Hoffmann et al. |
| 5,612,889 A | 3/1997 | Pintsov et al. |
| 5,619,571 A | 4/1997 | Sandstrom et al. |
| 5,623,546 A | 4/1997 | Hardy et al. |
| 5,649,118 A | 7/1997 | Carlisle et al. |
| 5,655,023 A | 8/1997 | Cordery et al. |
| 5,663,547 A | 9/1997 | Ziarno |
| 5,696,829 A | 12/1997 | Cordery et al. |
| 5,706,502 A | 1/1998 | Foley et al. |
| 5,708,422 A | 1/1998 | Blonder et al. |
| 5,715,314 A | 2/1998 | Payne et al. |
| 5,717,596 A | 2/1998 | Bernard et al. |
| 5,717,597 A | 2/1998 | Kara |
| 5,729,459 A * | 3/1998 | Brandien .......... G07B 17/00193 705/402 |
| 5,729,460 A | 3/1998 | Plett et al. |
| 5,729,674 A | 3/1998 | Rosewarne et al. |
| 5,742,683 A | 4/1998 | Lee et al. |
| 5,768,132 A | 6/1998 | Cordery et al. |
| 5,774,886 A | 6/1998 | Kara |
| 5,778,076 A | 7/1998 | Kara et al. |
| 5,796,834 A | 8/1998 | Whitney et al. |
| 5,801,364 A | 9/1998 | Kara et al. |
| 5,801,944 A | 9/1998 | Kara |
| 5,812,991 A | 9/1998 | Kara |
| 5,819,240 A | 10/1998 | Kara |
| 5,822,739 A | 10/1998 | Kara |
| 5,825,893 A | 10/1998 | Kara |
| 5,860,068 A | 1/1999 | Cook |
| 5,923,885 A | 7/1999 | Johnson et al. |
| 5,936,885 A | 8/1999 | Morita et al. |
| 5,946,671 A | 8/1999 | Herring |
| 5,960,418 A | 9/1999 | Kelly et al. |
| 5,983,209 A | 11/1999 | Kara |
| 6,005,945 A | 12/1999 | Whitehouse |
| 6,010,069 A | 1/2000 | Debois |
| 6,047,273 A * | 4/2000 | Vaghi ................ G06F 21/629 705/401 |
| 6,061,670 A | 5/2000 | Brand |
| 6,061,671 A | 5/2000 | Baker et al. |
| 6,175,825 B1 * | 1/2001 | Fruechtel ............ G06Q 30/04 705/30 |
| 6,199,055 B1 | 3/2001 | Kara et al. |
| 6,208,980 B1 | 3/2001 | Kara |
| 6,233,565 B1 * | 5/2001 | Lewis ................ G06Q 20/00 705/26.1 |
| 6,233,568 B1 * | 5/2001 | Kara ................ G01G 19/005 705/401 |
| 6,249,777 B1 | 6/2001 | Kara et al. |
| 6,385,504 B1 | 5/2002 | Pintsov et al. |
| 6,430,543 B1 | 8/2002 | Lee et al. |
| 6,470,327 B1 * | 10/2002 | Carroll ................ G01G 19/005 705/401 |
| 6,532,452 B1 | 3/2003 | Pintsov et al. |
| 6,834,273 B1 | 12/2004 | Sansone et al. |
| 6,853,990 B1 | 2/2005 | Thiel |
| 6,865,557 B1 | 3/2005 | Cordery et al. |
| 7,149,726 B1 | 12/2006 | Lingle et al. |
| 7,182,259 B2 | 2/2007 | Lubow et al. |
| 7,225,170 B1 | 5/2007 | Ryan, Jr. |
| 7,266,531 B2 | 9/2007 | Pintsov et al. |
| 7,337,152 B1 | 2/2008 | Gawler |
| 7,343,357 B1 | 3/2008 | Kara |
| 7,458,612 B1 | 12/2008 | Bennett |
| 7,509,291 B2 | 3/2009 | McBride et al. |
| 7,548,612 B2 | 6/2009 | Weissman et al. |
| 7,711,650 B1 | 5/2010 | Kara |
| 7,778,924 B1 | 8/2010 | Ananda |
| 7,784,090 B2 | 8/2010 | Lord et al. |
| 7,831,518 B2 | 11/2010 | Montgomery et al. |
| 7,831,824 B2 | 11/2010 | Abdulhayoglu |
| 7,840,492 B2 | 11/2010 | Leung et al. |
| 7,954,709 B1 | 6/2011 | Leon et al. |
| 7,963,437 B1 | 6/2011 | McBride et al. |
| 8,027,927 B2 | 9/2011 | Ogg et al. |
| 8,027,935 B1 * | 9/2011 | Begen ................ G06Q 20/28 705/401 |
| 8,041,644 B2 | 10/2011 | Ogg et al. |
| 8,046,823 B1 | 10/2011 | Begen et al. |
| 8,100,324 B1 | 1/2012 | Leon |
| 8,204,835 B1 | 6/2012 | Ogg |
| 8,240,579 B1 | 8/2012 | Bennett |
| 8,600,910 B1 | 12/2013 | Kara et al. |
| 8,612,361 B1 | 12/2013 | Bussell et al. |
| 8,626,673 B1 | 1/2014 | Bennett |
| 8,775,331 B1 | 7/2014 | Tsuie et al. |
| 9,208,620 B1 | 12/2015 | Bortnak et al. |
| 10,417,728 B1 | 9/2019 | Yoggi et al. |

(56) References Cited

U.S. PATENT DOCUMENTS

| | | | |
|---|---|---|---|
| 2001/0007086 A1 | 7/2001 | Rogers et al. | |
| 2001/0020234 A1 | 9/2001 | Shah et al. | |
| 2001/0022060 A1 | 9/2001 | Robertson et al. | |
| 2001/0042052 A1* | 11/2001 | Leon | G07B 17/00733 705/401 |
| 2002/0032573 A1* | 3/2002 | Williams | G06Q 10/08 705/335 |
| 2002/0032668 A1 | 3/2002 | Kohler et al. | |
| 2002/0032784 A1 | 3/2002 | Darago et al. | |
| 2002/0052841 A1 | 5/2002 | Guthrie et al. | |
| 2002/0065577 A1 | 5/2002 | Teraura et al. | |
| 2002/0073050 A1 | 6/2002 | Gusler et al. | |
| 2002/0082935 A1 | 6/2002 | Moore et al. | |
| 2002/0095347 A1* | 7/2002 | Cummiskey | G06Q 40/04 705/26.1 |
| 2002/0099652 A1 | 7/2002 | Herzen et al. | |
| 2002/0116318 A1* | 8/2002 | Thomas | G06Q 10/08 705/37 |
| 2002/0143431 A1 | 10/2002 | Sansone | |
| 2003/0029914 A1 | 2/2003 | Hortman et al. | |
| 2003/0037008 A1* | 2/2003 | Raju | G07B 17/0008 705/60 |
| 2003/0065739 A1 | 4/2003 | Shnier | |
| 2003/0080182 A1 | 5/2003 | Gunther | |
| 2003/0101143 A1 | 5/2003 | Montgomery et al. | |
| 2003/0101148 A1 | 5/2003 | Montgomery et al. | |
| 2003/0130963 A1* | 7/2003 | Stickler | G07B 17/00435 705/401 |
| 2003/0138345 A1 | 7/2003 | Schwabe | |
| 2003/0167241 A1 | 9/2003 | Gilham | |
| 2003/0182155 A1 | 9/2003 | Nitzan et al. | |
| 2003/0187666 A1 | 10/2003 | Leon | |
| 2003/0204477 A1 | 10/2003 | McNett | |
| 2003/0217018 A1* | 11/2003 | Groff | G06Q 30/06 705/404 |
| 2003/0233276 A1 | 12/2003 | Pearlman et al. | |
| 2003/0236709 A1 | 12/2003 | Hendra et al. | |
| 2004/0002926 A1 | 1/2004 | Coffy et al. | |
| 2004/0048503 A1 | 3/2004 | Mills et al. | |
| 2004/0064422 A1 | 4/2004 | Leon | |
| 2004/0083179 A1* | 4/2004 | Sesek | G06Q 20/04 705/53 |
| 2004/0083189 A1* | 4/2004 | Leon | G07B 17/00435 705/401 |
| 2004/0089482 A1 | 5/2004 | Ramsden et al. | |
| 2004/0122776 A1 | 6/2004 | Sansone | |
| 2004/0122779 A1 | 6/2004 | Stickler et al. | |
| 2004/0128264 A1 | 7/2004 | Leung et al. | |
| 2004/0185827 A1 | 9/2004 | Parks | |
| 2004/0185882 A1 | 9/2004 | Gecht et al. | |
| 2004/0186811 A1 | 9/2004 | Gullo et al. | |
| 2004/0212833 A1* | 10/2004 | Taskett | G06Q 10/08 358/1.18 |
| 2004/0215581 A1 | 10/2004 | Lord et al. | |
| 2004/0215583 A1 | 10/2004 | Elliott | |
| 2004/0230544 A1* | 11/2004 | Herbert | G07B 17/00508 705/401 |
| 2004/0254808 A1* | 12/2004 | Bennett | G06Q 30/04 705/26.1 |
| 2005/0065892 A1 | 3/2005 | Ryan et al. | |
| 2005/0065896 A1 | 3/2005 | Kummer et al. | |
| 2005/0065897 A1 | 3/2005 | Ryan et al. | |
| 2005/0071244 A1* | 3/2005 | Phillips | G06Q 10/08 705/26.41 |
| 2005/0080751 A1 | 4/2005 | Burningham | |
| 2005/0114222 A1* | 5/2005 | Mundy | G06Q 30/06 705/26.1 |
| 2005/0116047 A1 | 6/2005 | Lu et al. | |
| 2005/0119786 A1 | 6/2005 | Kadaba | |
| 2005/0171791 A1* | 8/2005 | Chimenti | G06Q 10/08345 705/335 |
| 2005/0171869 A1 | 8/2005 | Minnocci | |
| 2005/0192899 A1 | 9/2005 | Reardon | |
| 2005/0209913 A1* | 9/2005 | Wied | G06Q 10/083 705/12 |
| 2005/0237203 A1 | 10/2005 | Burman et al. | |
| 2005/0256811 A1 | 11/2005 | Pagel et al. | |
| 2005/0278266 A1 | 12/2005 | Ogg et al. | |
| 2006/0000648 A1 | 1/2006 | Galtier | |
| 2006/0020505 A1 | 1/2006 | Whitehouse | |
| 2006/0041519 A1 | 2/2006 | Ogg et al. | |
| 2006/0122947 A1 | 6/2006 | Poulin | |
| 2006/0173700 A1* | 8/2006 | Fenelon | G07B 17/00024 705/333 |
| 2006/0173796 A1 | 8/2006 | Kara | |
| 2006/0220298 A1 | 10/2006 | Fairweather et al. | |
| 2006/0259390 A1 | 11/2006 | Rosenberger | |
| 2006/0282271 A1* | 12/2006 | Ananda | G06Q 10/08 705/26.1 |
| 2006/0283943 A1 | 12/2006 | Ostrowski et al. | |
| 2007/0033110 A1 | 2/2007 | Philipp et al. | |
| 2007/0073587 A1 | 3/2007 | Walker et al. | |
| 2007/0078795 A1 | 4/2007 | Chatte | |
| 2007/0080228 A1 | 4/2007 | Knowles et al. | |
| 2007/0174213 A1* | 7/2007 | Whitehouse | G06Q 30/02 705/401 |
| 2007/0174215 A1 | 7/2007 | Morel | |
| 2007/0255664 A1 | 11/2007 | Blumberg et al. | |
| 2008/0154781 A1* | 6/2008 | Kumar | G06Q 20/382 705/64 |
| 2008/0281719 A1* | 11/2008 | Hall | G06Q 30/08 705/26.4 |
| 2009/0164392 A1 | 6/2009 | Raju et al. | |
| 2009/0172084 A1 | 7/2009 | Lavanya et al. | |
| 2010/0169241 A1* | 7/2010 | Schoonmaker | G07B 17/00508 705/408 |
| 2010/0235267 A1* | 9/2010 | Brookner | G06Q 40/12 705/30 |
| 2010/0298662 A1 | 11/2010 | Yu et al. | |
| 2010/0312627 A1* | 12/2010 | Khechef | G06Q 20/387 705/14.17 |
| 2011/0015935 A1 | 1/2011 | Montgomery et al. | |
| 2011/0022544 A1 | 1/2011 | Kim et al. | |
| 2011/0029429 A1* | 2/2011 | Whitehouse | G07B 17/00435 705/39 |
| 2011/0071944 A1 | 3/2011 | Heiden et al. | |
| 2011/0145107 A1 | 6/2011 | Greco | |
| 2011/0225180 A1 | 9/2011 | Liao et al. | |
| 2011/0242554 A1* | 10/2011 | Farry | G06Q 30/00 358/1.6 |
| 2011/0295646 A1* | 12/2011 | Barros | G06Q 10/06316 705/7.26 |
| 2012/0008766 A1 | 1/2012 | Robertson et al. | |
| 2012/0054754 A1 | 3/2012 | Teichmann et al. | |
| 2012/0159603 A1 | 6/2012 | Queck | |
| 2012/0226625 A1* | 9/2012 | Pfeffer | G06Q 50/28 705/341 |
| 2012/0233252 A1 | 9/2012 | Vats et al. | |
| 2012/0240204 A1 | 9/2012 | Bhatnagar et al. | |
| 2013/0056533 A1 | 3/2013 | Zimberoff et al. | |
| 2013/0066794 A1* | 3/2013 | Hill | G07B 17/0008 705/317 |
| 2013/0254132 A1* | 9/2013 | Srinath | G06Q 10/0834 705/334 |
| 2014/0019517 A1* | 1/2014 | Fawcett | G06Q 10/0833 709/203 |
| 2014/0067665 A1* | 3/2014 | Paletz | G06Q 10/08345 705/40 |
| 2014/0265300 A1* | 9/2014 | Jena | G06Q 10/083 283/67 |
| 2014/0324633 A1* | 10/2014 | Pollak | G06Q 10/083 705/26.63 |

FOREIGN PATENT DOCUMENTS

| | | | |
|---|---|---|---|
| EP | 0927958 A2 | 7/1999 | |
| EP | 0927963 A2 | 7/1999 | |
| EP | 1785856 A2 | 5/2007 | |
| EP | 2423886 A1 * | 2/2012 | G07B 17/00435 |
| FR | 2580844 A1 | 10/1986 | |

(56) References Cited

FOREIGN PATENT DOCUMENTS

| | | | |
|---|---|---|---|
| GB | 2251210 A | 7/1992 | |
| JP | 04284558 B2 | 10/1992 | |
| JP | 2000-105845 A | 4/2000 | |
| RE | 0571259 A1 | 11/1993 | |
| WO | WO-88/01818 A1 | 3/1988 | |
| WO | WO-97/40472 A1 | 10/1997 | |
| WO | WO-98/14907 A2 | 4/1998 | |
| WO | WO-98/14909 A2 | 4/1998 | |
| WO | WO-9814907 A2 * | 4/1998 | ......... G07B 17/0008 |
| WO | WO-98/57302 A1 | 12/1998 | |
| WO | WO-98/57460 A1 | 12/1998 | |
| WO | WO-02/063517 A2 | 8/2002 | |
| WO | WO-02/093498 A2 | 11/2002 | |
| WO | WO-02093498 A2 * | 11/2002 | ........... G09F 3/0288 |
| WO | WO-03/039051 A2 | 5/2003 | |
| WO | WO-03/083784 A1 | 10/2003 | |

OTHER PUBLICATIONS

Times Wire Services. "Pitney Bowes, Stamps.com End Litigation: The Companies Had Sued Each Other, Claiming Infringement of Patents for Buying and Printing Postage via the Internet." The Los Angeles times (2003): C2—. Print. (Year: 2003).*

"Stamps.Com Acquires Patents." The Wall Street journal. Eastern edition (2001): B7—. Print. (Year: 2001).*

Ford, C., "Frequent Flyer Programs," Australian Accountant, 63,1, Feb. 1993, pp. 52-58, 7 pages.

Alexander, K.L., "U.S. Stamps Pay Tribute to Starry-Eyed Jurors," Final Edition, Calgary Herald, Calgary, Alberta, Canada, Sep. 14, 2007, 2 pages.

Non-Final Office Action dated Aug. 3, 2009 for U.S. Appl. No. 11/353,690 to Kara, filed Feb. 14, 2006, and entitled "System and Method for Validating Postage," 19 pages.

"Domestic Mail Manual Section 604," United States Postal Service, Aug. 31, 2005, 45 pages.

"Mobile Postage stamps via text message announced", http://telecoms.cytalk.com/2011/03/mobile-postage-stamps-via-text-messages-announced/, CY.TALK Telecoms News Blog, Mar. 14, 2011 in Telecoms, Texting, pp. 1-9.

Mobile Postage Stamps via Text Messages Announced, Phone Reviews, Mobile Phones, News, Mar. 11, 2011, pp. 1-3.

Anonymous, "Automated Indicia Detection System From Parascript Protects Postage Revenue for Postal Operators, Cracks Down on Fraud:—Parascript StampVerify Simplifies Complex Task of Automatically Locating and Verifying Different Types of Indicia on Envelope Images—," PR Newswire, New York, Sep. 18, 2007, 2 pages.

Davies, Brad L. "Printing System for Preventing Injustice by Delivering Print Data from Postal Charge Meter to Printer," Jan. 2001, 1 page.

Unpublished U.S. Appl. No. 12/103,496 to Bortnak et al., filed Apr. 15, 2008 and entitled "Systems and Methods for Activation of Postage Indicia at Point of Sale," 40 pages.

Unpublished U.S. Appl. No. 11/509,309 to Leon filed Aug. 24, 2006 and entitled "Invisible Fluorescent Ink Mark," 15 pages.

Unpublished U.S. Appl. No. 12/030,739 to McBride et al. filed Feb. 13, 2008 and entitled "Systems and Methods for Distributed Activation of Postage," 35 pages.

Unpublished U.S. Appl. No. 11/323,463 to Leon et al. filed Dec. 30, 2005 and entitled "Systems and Methods for Single Pass Printing Postage Indicia," 23 pages.

Unpublished U.S. Appl. No. 10/606,579 to Ogg, filed Jun. 26, 2003 and entitled "System and Method for Automatically Processing Mail," 15 pages.

International Search Report and Written Opinion issued for PCT Application No. PCT/US2017/020662, dated May 19, 2017, 14 pages.

International Search Report issued for PCT/US95/00237, dated May 29, 1995, 4 pages.

* cited by examiner

SYSTEMS AND METHODS FACILITATING SHIPPING SERVICES RATE RESALE

CROSS-REFERENCE TO RELATED APPLICATIONS

The present application is a continuation of U.S. patent application Ser. No. 15/607,215 entitled "Systems and Methods Facilitating Shipping Services Rate Resale," filed May 26, 2017, which is a division of U.S. patent application Ser. No. 14/055,473 entitled "Systems and Methods Facilitating Shipping Services Rate Resale," filed Oct. 16, 2013, which is related to commonly assigned U.S. patent application Ser. No. 12/963,472 entitled "System and Method for Remote Postage Metering," filed Dec. 8, 2010 and Ser. No. 11/616,569 entitled "Postage Metering with Accumulated Postage," filed Dec. 27, 2006, the disclosures of which are hereby incorporated herein by reference in their entirety.

TECHNICAL FIELD

The invention relates generally to shipping services and, more particularly, to facilitating shipping services rate resale.

BACKGROUND OF THE INVENTION

The purchase of and payment for various shipping services, including shipment (often referred to as "posting" or "mailing", depending upon the particular items) of items, shipping insurance, etc., may be provided for in a number of ways. For example, shipping service providers, such as the United States Postal Service (USPS), United Parcel Service (UPS), Federal Express (FedEx), and others, provide means by which shippers (e.g., individuals and businesses) may directly purchase and pay for shipping services. Likewise, a number of third party vendors, such as Stamps.com (the assignee of the present patent application), ShipStation, etc., also provide means by which shippers may more conveniently and/or less expensively purchase and pay for shipping services. When a shipper purchases and/or pays for selected shipping services from any of the foregoing, some form of proof of prepayment or mechanism for post-payment for the shipping services is generated (collectively referred to as payment indicia), such as in the form of an indicia (e.g., an information based indicia (IBI) as used for postal services) or shipping label (e.g., shipping service provider compliant shipping labels), for including with the item to be shipped.

In some cases, the third party vendors enter into reseller agreements with one or more of the shipping service providers whereby the third party vendor negotiates a discounted rate for various shipping services. Such a reseller may thus resell the shipping services (perhaps at a discount over the shipping service provider's published rate (often referred to as commercial based pricing (CBP))) to their customers at a profit. However, negotiated rates may not be available for all shipping services. For example, the USPS may agree to negotiated rates with respect to some shipping services (e.g., express mail, priority mail, etc.) while remaining non-negotiable with respect to other shipping services (e.g., first class mail, shipping services involving certain special services, etc.). Accordingly, a reseller may be in the position of having different discount and/or profit models with respect to different shipping services, even when provided by the same shipping service provider. As a result, the reseller may be able to provide its discounts with respect to certain shipping services and may either provide other shipping services at an added cost over CBP rates or provide those shipping services without profit margin due to there being no discount available to the reseller.

Further complicating the mixed negotiated/non-negotiated rate situation for the resellers is that the shipping service providers may process particular shipping service purchase transactions differently. For example, the USPS may absorb the costs of processing credit card payments for the direct purchase of postage by a shipper, whereas a reseller may bare that cost for the same shipping service if resold to its customer. Accordingly, on shipping services where a reseller discount is not negotiated (e.g., first class postage) and transaction costs are borne by the reseller, the reseller may be forced to resell these shipping services at a premium over the CBP rates to avoid an out of pocket loss by the reseller. Additionally or alternatively, the reseller may have its customers use a direct shipping service provider account (e.g., requiring the shipper to establish both an account with the reseller and an account directly with the shipping service provider) in order to facilitate the purchase and payment for certain shipping services without requiring out of pocket losses by the reseller in association with these certain shipping services.

The forgoing can be a source of appreciable confusion and great dissatisfaction with the reseller's customers, due to their customers having to manage and maintain two separate accounts, their customers having to understand the separate rating and cost structures, etc. For example, when maintaining multiple accounts, monies added to one account are not available for shipping services purchased through the other such account thus resulting in situations where the shipper has sufficient funds for a shipping service, but which are in the wrong account for obtaining the most economical shipping service alternative. In implementing separate rating and cost structures (e.g., that available through the reseller account and that available through the shipping service provider directly) associated with the different accounts, the reseller may provide a number of alternative rates for various shipping services. For example, the reseller may present its customer with six rates (e.g., USPS First Class, USPS Priority, and USPS Express for the shipping service direct rates and Reseller First Class, Reseller Priority, and Reseller Express for the reseller rates) for the same shipping transaction, for selection by the shipper. The difference in rates, and the reason for their differences, may present a source of confusion to the shipper.

It can be appreciated that, if the services of more than one shipping service provider (e.g., a combination of any of USPS, UPS, FedEx, etc.) were to be accommodated by a third party vendor, the foregoing problems would compound. For example, a reseller's customer may be required to establish, manage, and maintain accounts with each such shipping service provider. Moreover, reseller agreements often prohibit the reseller from simultaneously presenting the rate information of different shipping services providers to a user for rate shopping, thereby resulting in a complicated user interface if a user is to be provided the opportunity to optimize their shipping purchases.

BRIEF SUMMARY OF THE INVENTION

The present invention is directed to systems and methods which provide a shipping service resale platform enabling single shipper account access to multiple shipping service rate schedules. Shipping service rate optimization is facilitated for a shipper using a single shipper account of embodiments of the invention. For example, a shipper is enabled to utilize rates available from various rate schedules, such as may include reseller negotiated rates, shipping service provider published rates (e.g., commercial based pricing (CBP)), etc., through a single shipper account of the shipping service resale platform.

Different shipping service provider payment mechanisms (e.g., different postage security devices (PSDs) for a shipping service provider, shipping service provider prepaid accounts, shipping service provider postpaid accounts, etc.) may be implicated in association with a shipper's purchase and payment for shipping services according to embodiments of the invention. The shipper is, however, enabled to establish, manage, and maintain a single shipper account for use in purchase and payment of shipping services which implicate the aforementioned different shipping service provider payment mechanisms. Accordingly, shippers utilizing embodiments of a shipping service resale platform herein may fund and manage a single account and yet take advantage of rates associated with offerings (e.g., reseller discounted rates, shipping service provider CBP rates, etc.) traditionally requiring separate accounts and/or surcharges (e.g., a premium added to the rate by a reseller).

Embodiments of the invention operate to provide automated optimization with respect to shipping service rate selection. For example, because single shipper accounts implemented according to embodiments of the invention are agnostic with respect to supplier, reseller, and shipping service provider payment mechanisms, logic of a shipping service resale platform may operate to dynamically (e.g., on a transaction by transaction basis) select an optimal rate and attendant payment mechanism for any shipping transaction.

A shipper is provided with a combined rate table in accordance with embodiments of the invention. Such a combined rate table establishes the rates for various shipping services for that shipper irrespective of the particular rate schedules and/or supplier, reseller, or shipping service provider payment mechanisms which may ultimately be used in association with the shipper's purchase and payment for the shipping services. Accordingly, the shipper's rating scheme is simplified from the vantage point of the shipper while, nevertheless, taking advantage of optimized rate schedules as may be available through various shipping service provider payment mechanisms.

It should be appreciated that the rate schedules from which a shipping service resale platform of embodiments may serve a shipper's transactions are not limited to a single shipping service provider. For example, the agnosticism with respect to the shipping service provider payment mechanisms according to embodiments herein may be extended across different shipping service providers to thereby facilitate single shipper account access to the shipping services of multiple shipping service providers (e.g., any combination of USPS, UPS, FedEX, etc.). Any or all such shipping service providers may provide various rate schedules, including reseller negotiated rates, CBP rates, etc. A shipping service resale platform of embodiments may thus operate to provide aggregated access to such shipping service providers, rate schedules, and/or resellers.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1A:
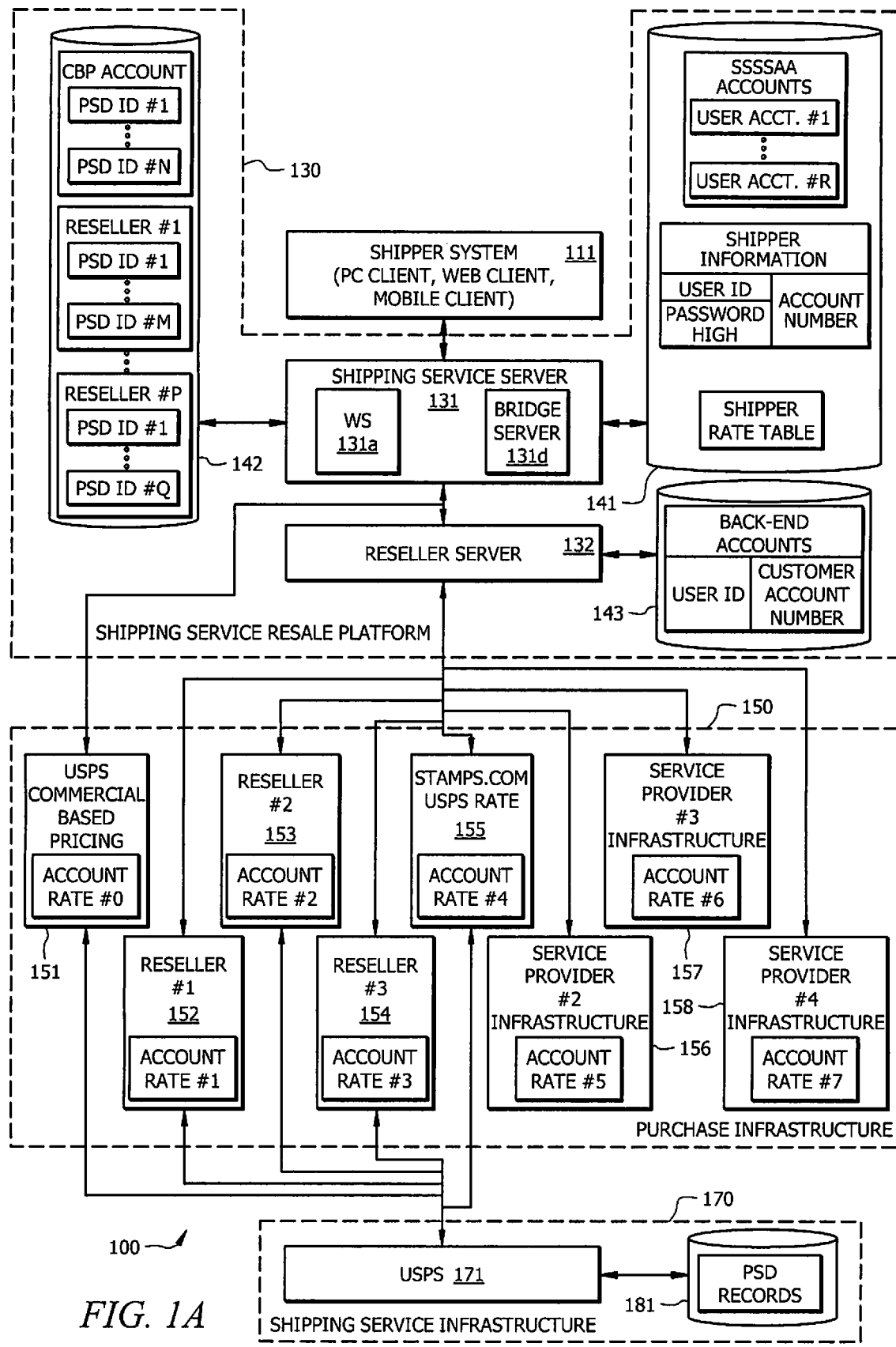
FIGS. 1A and 1B show functional block diagrams of shipping transaction systems adapted to include a shipping service resale platform enabling single shipper account access for shipping service transactions according to embodiments of the invention.

FIG. 1A shows a functional block diagram of shipping transaction system 100 adapted to include a shipping service resale platform enabling single shipper account access to multiple shipping service rate schedules. Single shipper accounts implemented according to embodiments of the invention may include single user single shipper accounts, multiuser single shipper accounts, and combinations thereof.

Figure 1B:
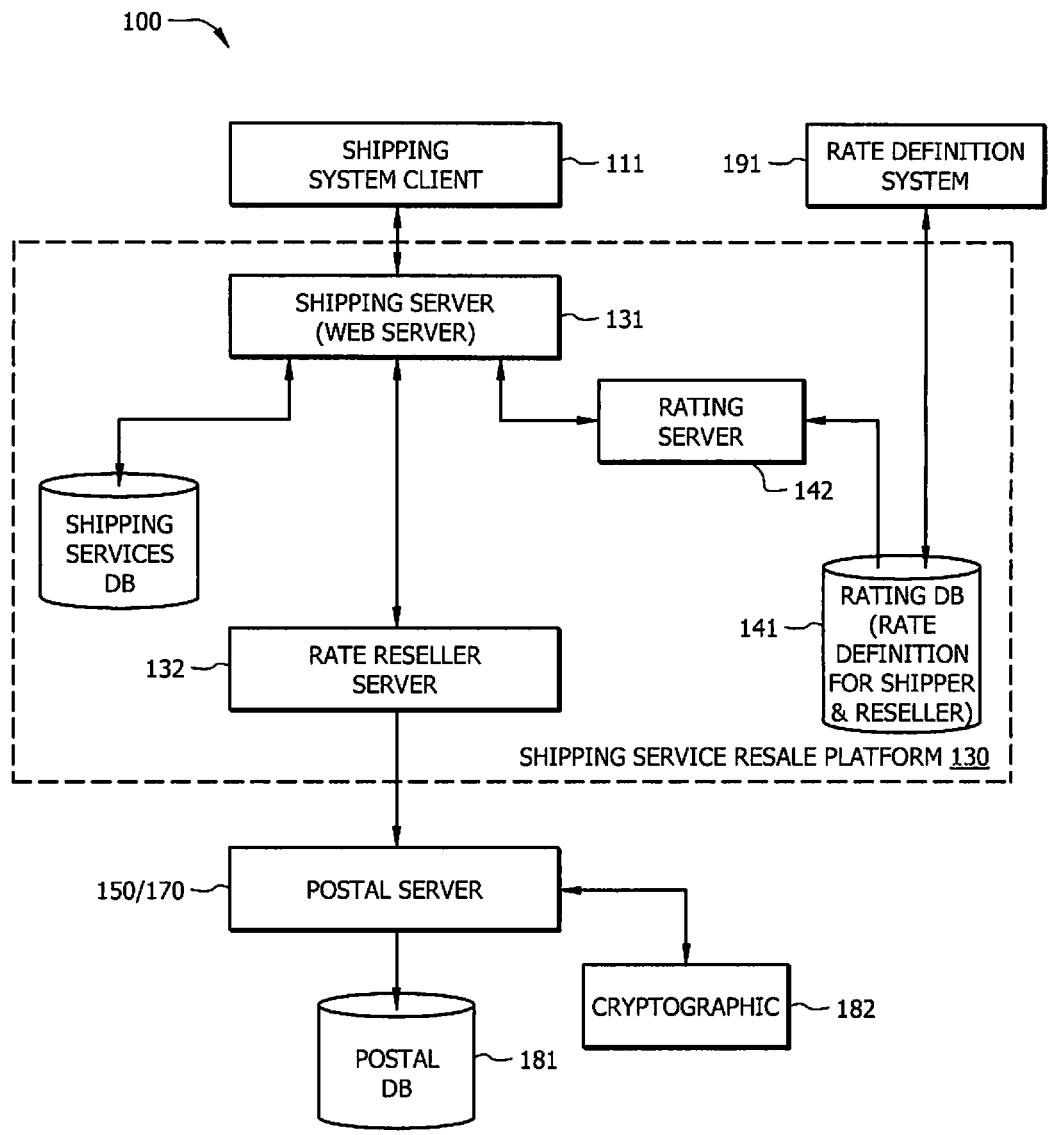

The embodiment illustrated in FIG. 1A includes shipping service resale platform 130 coupled between shipper system 111 and purchase infrastructure 150 and shipping service infrastructure 170 to implement single shipper account access for shipping service transactions. This disposition of shipping service resale platform 130 between shipper system 111 and purchase infrastructure 150/shipping service infrastructure 170 for implementing single shipper account access with respect to shipping service transactions is perhaps more readily apparent in the simplified functional block diagram of shipping system 100 shown in FIG. 1B.

The links shown in FIG. 1A provide suitable communication links for facilitating cooperative interaction and data transfer as described herein. Accordingly, such links may include suitable wireline or wireless links, such as may comprise links of local area networks (LANs), metropolitan area networks (MANs), wide area networks (WANs), wireless LANs (WLANs), the Internet, intranets, extranets, cable transmission systems, cellular communication networks, and the like.

Through operation of shipping service resale platform 130, a shipper utilizing shipper system 111 is enabled to utilize rates of rate schedules available using various infrastructure of purchase infrastructure 150. Accordingly, shipping service rate optimization, as may dynamically utilize reseller negotiated rates, shipping service provider published rates (e.g., commercial based pricing (CBP)), etc., is thus facilitated for a shipper using a single shipper account of the shipping service resale platform of embodiments of the invention.

Shipper system 111 of embodiments herein may comprise any number of system configurations used by a customer of shipping services (referred to herein as a shipper). For example, shipper system 111 may comprise a general purpose processor-based system (e.g., personal computer (PC) having a processor, memory, suitable input/output (I/O) functionality, and operating system (OS)) operating under control of a client application (e.g., PC client, web client, mobile client, tablet client, etc.) to interface with shipping service resale platform 130 and provide operation as described herein. Additionally or alternatively, shipper system 111 may comprise a processor-based device such as a smart phone, a tablet device, a personal digital assistant (PDA), an Internet appliance (e.g., a processor-based postage printer Internet appliance), etc., having the requisite instruction set and processing and I/O resources. The interface architecture implemented according to embodiments of the invention not only accommodate standalone client applications, but support other forms of client access, such as through third party software access integration. It should be appreciated that although one shipper system is shown in FIG. 1A, any number and combination of configurations of shipper systems may be accommodated according to embodiments.

Shipping service resale platform 130 of embodiments of the invention preferably comprise one or more processor-based systems operable to provide the functionality described herein. For example, shipping service resale platform 130 may comprise one or more servers having a processor, memory, suitable I/O functionality and OS which are operable under control of one or more server application to facilitate single shipper account access for shipping service transactions as described herein. The illustrated embodiment of shipping service resale platform 130 comprises shipping service server 131 and reseller server 132 cooperative to facilitate shipping service transactions through purchase infrastructure 150 and/or shipping service infrastructure 170 for shippers using shipper system 111. As will be better understood from the following, purchase infrastructure 150 and shipping service infrastructure 170 of embodiments cooperate, in response to control provided by shipping service resale platform 130, to facilitate shipping service transactions by generating value indicia (e.g., postage indicia), prepaid accounting transactions, post-paid accounting transactions, manifests, bills of lading, etc., utilized for the respective shipping services.

Shipping service server 131 of the illustrated embodiment provides an interface whereby shipper system 111 may access a single shipper account of a shipper for performing various shipping transactions. In operation according to embodiments of the invention different shipping system configurations are supported and thus shipping service server 131 may be adapted to provide interfaces to accommodate these different shipping system configurations. Shipping service server 131 of the illustrated embodiment is shown as including web service 131a to accommodate interfacing with web clients and bridge server 131b to accommodate interfacing with PC clients. Of course, additional or alternative interfacing may be implemented as appropriate according to embodiments of the invention.

In operation according to embodiments, shipping service server 131 provides a user interface front-end for facilitating shippers' shipping service transactions. Additionally, shipping service server 131 of embodiments provides back-end logic and processing to select appropriate infrastructure for implementing a shipping service transaction.

As part of a user interface front-end, shipping service server 131 is operable to provide authentication and account access, to provide shippers with information regarding rates for shipping services, and to initiate purchase and payment processing in response to shipper requests. Accordingly, shipping service server 131 is shown to be in communication with shipper database 141, as may store shipper related information, one or more rate table applicable to a shipper account, shipper accounts, etc. Embodiments may utilize one or more rating server, such as rating server 142 shown in FIG. 1B, which may be integrated as part of shipping service server 131 or coupled thereto.

Shipper related information may comprise customer information associating shipper credentials (e.g., user ID) with one or more shipper account providing single shipper account access for shipping transactions. It should be appreciated that such customer information may comprise validation information (e.g., password hash, cryptographic key, digital certificate, etc.) used in authenticating users of the system.

A shipper rate table stored in database 141 may provide a combined rate table for use with respect to shipping service transactions requested by a shipper. Such a combined rate table establishes the rates for various shipping services for that shipper irrespective of the particular rate schedules and/or shipping service provider payment infrastructure which may be used in association with the shipper's purchase and payment for the shipping services. The rates provided in a combined rate table of a shipper's account in accordance with embodiments of the invention may be based on market conditions (e.g., rates competitive to those offered by the shipping service providers, resellers, third party suppliers, etc.), may be based upon the underlying rate schedules available to an operator of the shipping service resale platform, may be based upon a discount/premium rate (e.g., fixed or variable percentage), etc., and combinations thereof. Rating information as may be utilized in generating a combined rate table utilized according to embodiments of the invention may be provided by one or more rate definition system (e.g., as may be maintained by various shipping service providers or other providers of appropriate rate information), such as rate definition system 191 shown in FIG. 1B, which may be integrated as part of the shipping service resale platform or coupled thereto.

A shipper rate table of embodiments provides shipping service rates, rate discounts, and/or rate premiums applicable to one or more shipper account. In operation according to embodiments, where the shipper rate table provides rates for shipping services, logic of shipping service server 131 may operate to implement shipping service purchase/payment transactions to fulfill requested shipping service transactions at rates compatible with the applicable rate table. Additionally or alternatively, where the shipper rate table provides rate discounts/premiums for shipping services, logic of shipping service server 131 may operate to implement shipping service purchase/payment transactions to fulfill requested shipping service transactions for which the discount/premium is applied.

In providing single shipper account access for shipping transactions according to embodiments of the invention, a shipper is provided one or more shipping service single shipper account access (SSSSAA) account from which their purchases and payments are serviced. Accordingly, the embodiment illustrated in FIG. 1A includes SSSSAA accounts stored in database 141 for access by shipping service server 131. The SSSSAA accounts may be linked to their respective shippers through account numbers of the customer information discussed above. In operation according to embodiments, SSSSAA accounts comprise prepaid or postpaid account balances maintained with respect to the shippers utilizing the shipping service resale platform. For example, a SSSSAA account may reflect an amount of unused money deposited with an operator of shipping service resale platform 130 available to a particular shipper in purchase and payment for shipping services transactions made at their request. Additionally or alternatively a SSSSAA account may reflect an amount of accrued money owed to an operator of shipping service resale platform 130 by a particular shipper for purchase and payment for shipping services transactions made at their request.

It should be appreciated that SSSSAA accounts implemented according to embodiments of the invention do not comprise traditional shipping service provider prepaid accounts (e.g., USPS meter accounts) which are regulated by the shipping service provider and which are typically limited to use with respect to that shipping service provider's services and a particular rate schedule for that shipping service provider. Instead, SSSSAA accounts of embodiments herein are supplier, reseller, and shipping service provider agnostic and thus enable a shipper to create, fund, manage, and maintain a single account balance regardless of the particular shipping services and rate schedule implicated by requested shipping service transactions.

As part of the back-end logic and processing, shipping service server 131 is operable select infrastructure appropriate for completing a shipper's requested shipping service transaction. For example, a shipper is enabled to utilize rates available from various rate schedules, such as may include reseller negotiated rates, rates from different resellers, shipping service provider published rates (e.g., commercial based pricing (CBP)), rates from different shipping service providers, etc., through a single shipper account of the shipping service resale platform to facilitate shipping service rate optimization. Accordingly, logic of shipping service server 131 may operate to select a particular shipping service provider, reseller, shipping service provider payment infrastructure (e.g., different postage security device (PSD), shipping service provider prepaid account, shipping service provider postpaid account, etc., for use in completing a shipping service transaction for a shipper.

Shipping service server 131 is shown in communication with database 142 for facilitating the aforementioned back-end processing. Database 142 may comprise information for facilitating selection of particular infrastructure for implementing purchase/payment transactions for shipping service transactions requested by shippers. Accordingly, the illustrated embodiment of database 142 includes information regarding shipping service provider accounts (e.g., CBP accounts), vendor accounts (e.g., supplier accounts, reseller accounts), etc. (collectively referred to as back-end accounts) accessible to shipping service resale platform 130 for performing purchase/payment transactions on behalf of shippers. Such information may include rate schedules associated with the accounts, information identifying infrastructure (e.g., PSD identification) serving the accounts, restrictions or limitations associated with the accounts, status of the accounts, usage information and/or logs for the accounts, etc. It should be appreciated that these back-end accounts may be established, managed, and maintained by someone other than the shippers on whose behalf they are utilized. For example, an operator of shipping service resale platform 130 may have established one or more such back-end accounts for use as described herein. Likewise, a reseller providing reseller infrastructure may have established one or more such back-end accounts for use as described herein. A shipper, however, may have established one or more accounts as may be utilized as a back-end account according to embodiments of the invention. For example, a shipper may have previously established a reseller account prior to having discovered single shipper account access for shipping services transactions provided by a shipping service resale platform herein. Accordingly, that reseller account may continue to be used, as determined appropriate by logic of shipping service server 131, by the shipper.

Any of the foregoing back-end accounts may have various purchase infrastructure associated therewith. For example, a reseller providing resale of USPS shipping services may provide different PSDs for use with respect to different rate schedules (e.g., PSDs for negotiated rates, PSDs for CBP rates, etc.), shipper regions (e.g., different PSDs for each of a plurality of regions from which the shippers may ship items), and/or the like. Accordingly, infrastructure identification information (e.g., PSD identification information, PSD pool identification information, back-end account portal identification information, etc.) may be provided in database 142. Moreover, information regarding the infrastructure (e.g., operational state, access load distribution, proximity to requesting server, etc.), its suitability for use in a particular transaction (e.g., descending register balance, transaction cost information, etc.), and the like, may likewise be provided in database 142. Logic of shipping service server 131 may utilize any or all of the foregoing information in selecting the particular infrastructure for serving a particular shipping service transaction requested by a shipper.

From the foregoing it can be appreciated that embodiments of the invention may operate to provide automated optimization with respect to shipping service rate selection. For example, because single shipper accounts implemented according to embodiments of the invention are agnostic with respect to shipping service provider payment infrastructure used, logic of shipping service server 131 may operate to dynamically (e.g., on a transaction by transaction basis) select an optimal rate and attendant reseller or shipping service provider payment infrastructure for any shipping transaction.

Reseller server 132 of the illustrated embodiment of shipping service resale platform 130 cooperates with shipping service server 131 to facilitate shipping service transactions through purchase infrastructure 150 and/or shipping service infrastructure 170 for shippers using shipper system 111. In operation according to embodiments, reseller server 132 provides an interface to purchase infrastructure 150 for implementing shipping service transactions using infrastructure as selected by logic of shipping service server 131. Accordingly, reseller server 132 may initiate a transaction at selected infrastructure of purchase infrastructure 150, such as to generate a shipping service provider compliant shipping label, a postage indicia, a shipping manifest, a bill of lading, etc., for use as payment indicia with respect to a shipping service requested by the shipper. Correspondingly, an accounting for the transaction (e.g., debiting a descending register of a PSD, incrementing a balance in a post-paid account, debiting a balance in a prepaid account, etc.) may be performed by the purchase infrastructure, as discussed in further detail below.

It should be appreciated that one or more of the back-end accounts may require authorization or validation for access. Accordingly, reseller server 132 is shown in communication with database 143 providing information useful in facilitating access to the various back-end accounts according to embodiments of the invention. For example, database 143 of the illustrated embodiment includes account credential information useful in obtaining access to corresponding ones of the back-end accounts of purchase infrastructure 150. Such credential information may be provided by a shipper for use with respect to their requested shipping services transactions, such as where the shipper has previously established an account with a reseller or other shipping services vendor.

Although the embodiment of shipping services resale platform 130 illustrated in FIG. 1A shows shipping service server 131 and reseller server 132 as separate server blocks, there is no limitation to this particular configuration according to the concepts herein. Accordingly, functionality of shipping service server 131 and of reseller server 132 may be integrated into a single server functional block, if desired, according to embodiments of the invention.

In operation of shipping service resale platform 130, a shipper utilizing shipper system 111 is enabled to utilize rates of rate schedules available using various infrastructure of purchase infrastructure 150. Accordingly, purchase infrastructure 150 of the illustrated embodiment comprises various shipping service transaction interfaces which have different rate schedules associated therewith. Purchase infrastructure 150 of embodiments of the invention preferably comprise interface infrastructure and logic adapted to implement shipping service purchase and/or payment using an associated rate schedule. Accordingly, purchase infrastructure 150 may comprises one or more processor-based systems, whether deployed and managed by an operator of shipping service resale platform 130 and/or by a reseller or other third party supplier, operable to provide the functionality described herein. For example, purchase infrastructure 150 may comprise one or more servers having a processor, memory, suitable I/O functionality and OS which are operable under control of one or more server application to implement shipping service transactions. The illustrated embodiment of purchase infrastructure 150 comprises purchase infrastructure 151-158, each of which may have a different rate schedule, reseller or third party supplier, and/or shipping service provider associated therewith.

Although purchase infrastructure 150 is shown separate from shipping service resale platform 130, it should be appreciated that some or all such infrastructure may be provided in an integrated implementation with systems of shipping service resale platform 130. For example, where an operator of shipping service resale platform 130 provides purchase infrastructure (e.g., purchase infrastructure 151 providing CBP rates) to supplement that of resellers or other third party suppliers, that purchase infrastructure may be integrated within shipping service resale platform 130 of embodiments of the invention.

Purchase infrastructure 151, for example, provides an interface for generating payment indicia (e.g., postage indicia, shipping service provider compliant shipping labels, etc.) using a shipping service provider (e.g., USPS) CBP rate schedule. Purchase infrastructure 152, 153, 154, and 155 provide interfaces for generating payment indicia using reseller negotiated rate schedules (e.g., a first reseller's, a second reseller's, a third reseller's negotiated rates, and a fourth reseller's negotiated rates for USPS shipping services).

It should be appreciated that the rate schedules supported by the foregoing purchase infrastructure may provide different rates and/or different costs with respect to the same shipping services. For example, purchase infrastructure 151 providing CBP rates may provide a solution in which the shipping service provider (e.g., USPS) absorbs the costs of credit card transactions used in obtaining credit value stored in an associated PSD, whereas purchase infrastructure 152, 153, 154, and 155 providing negotiated rates may provide solutions in which the reseller or vendor bares the costs of such credit card transactions. Additionally or alternatively, purchase infrastructure 151, 152, 153, 154, and 155, although each implementing rate schedules for a same shipping service provider (e.g., USPS), may each provide different rates with respect to one or all of the shipping services supported, such as due to different negotiated rates. Such differences in rates and costs may cause logic of shipping service server 131 to select a particular purchase infrastructure for use with respect to a particular shipping service transaction.

The rate schedules from which shipping service resale platform 131 of embodiments may serve a shipper's transactions are not limited to a single shipping service provider. Accordingly, purchase infrastructure 150 of the illustrated embodiment includes purchase infrastructure associated with different shipping service providers. For example, purchase infrastructure 151, 152, 153, 154, and 155 may be associated with a first shipping service provider (e.g., USPS), purchase infrastructure 156 may be associated with a second shipping service provider (e.g., FedEx), purchase infrastructure 157 may be associated with a third shipping service provider (e.g., DHL), purchase infrastructure 158 may be associated with a fourth shipping service provider (e.g., UPS), and so on. Accordingly, purchase infrastructure 156, 157, and 158 provide interfaces for generating payment indicia using rate schedules (e.g., negotiated rate schedules, CBP rate schedules, etc.) of various shipping service providers (e.g., FedEx, DHL, and UPS, respectively). It should be appreciated that purchase infrastructure 156, 157, and/or 158 may be provided in configurations similar to that of purchase infrastructure 151, 152, 153, 154, and 155, although being for a different shipping service provider. Of course, a plurality of purchase infrastructure may be provided with respect to any such other shipping service provider, if desired. Any of purchase infrastructure 156, 157, or 158 may be associated with a reseller and thus shipping service infrastructure for the shipping service provider may be coupled thereto, similar to shipping service infrastructure 170. Additionally, any of purchase infrastructure 156, 157, or 158 may provide a direct, non-reseller link to shipping service infrastructure, such as for CBP of that shipping service provider, similar to purchase infrastructure 151. Shipping service resale platform 130 of embodiments may thus operate to provide to provide aggregated access to such shipping service providers, rate schedules, and/or resellers.

Performing shipping service transactions as requested by a shipper may involve interoperation with shipping service infrastructure, such as to generate payment indicia, to obtain value used in payment indicia, to account for the value of payment indicia, etc. Accordingly, purchase infrastructure 150 of the illustrated embodiment is shown in communication with shipping service infrastructure 170 for facilitating shipping service transactions herein.

Shipping service infrastructure 170 of embodiments of the invention preferably comprises one or more processor-based systems operable to provide the functionality described herein. For example, shipping service infrastructure 170 may comprise one or more servers having a processor, memory, suitable I/O functionality and OS which are operable under control of one or more server application to facilitate shipping service transactions. The illustrated embodiment of shipping service infrastructure 170 comprises shipping service provider server 171 operable to perform shipping service transactions independently or in cooperation with purchase infrastructure 150 with respect to a particular shipping service provider (e.g., USPS). For example, shipping service server 171 may comprise one or more server system adapted to provide payment indicia generation using virtual PSDs as may be loaded into cryptocards for use in shipping service transactions (e.g., Internet postage server systems compliant with USPS requirements, such as Internet server systems operated by Stamps.com). Accordingly, database 181 storing PSD records of the virtual PSDs, as may be used in the generation of payment indicia, is shown in communication with shipping service server 171. Cryptographic resources, such as crypto-card 182 shown in FIG. 1B, may be utilized to provide such PSDs or otherwise in the generation of value indicia. Detail with respect to embodiments of shipping service server and virtual PSDs as may be adapted for use according to embodiments of the invention is provided in the above referenced patent application entitled "System and Method for Remote Postage Metering."

Although only one example of a shipping service server is shown in FIG. 1A, it should be appreciated that additional or alternative such shipping service servers may be provided according to embodiments of the invention. For example, a plurality of shipping service servers may be provided to facilitate shipping service transactions with respect to other shipping service providers (e.g., FedEx, DHL, UPS, etc.).

It should be appreciated that operation of shipping service resale platform 130 of embodiments of the invention is not limited to use with respect to resellers or other third party sellers of shipping service provider services. For example, for shipping services where negotiated discounts are not available to resellers (e.g., USPS first class mail, USPS shipping services which include certain special services, etc.) less cost may be incurred through purchase and payment directly with the shipping service provider (e.g., the USPS may bear the cost of credit card transactions), thereby suggesting that a reseller is not to be used for such transactions. Accordingly, shipping service resale platform 130 of the illustrated embodiment is adapted to perform shipping service transactions with shipping service infrastructure 170 without interacting with purchase infrastructure of a reseller or other third party. Purchase infrastructure 151 of the illustrated embodiment provides an interface with shipping service infrastructure 170 which does not utilize reseller infrastructure or reseller rate schedules.

From the above it should be appreciated that shipping service resale platform provides single shipper account access to multiple shipping service rate schedules. In particular, the illustrated embodiment enables single shipper account access to one or more CBP rate schedule (via purchase infrastructure 151 (USPS), 157 (DHL), and 158 (UPS)), one or more USPS reseller rate schedule (via purchase infrastructure 152, 153, 154, and 155), and one or more FedEx reseller rate schedule (via purchase infrastructure 156). Although different shipping service provider payment mechanisms (e.g., different postage security devices (PSDs) for a shipping service provider, shipping service provider prepaid accounts, shipping service provider postpaid accounts, etc.) may be implicated in association with a shipper's purchase and payment for shipping services, the shipper is enabled to establish, manage, and maintain a single shipper account for use in purchase and payment of the shipping services. Accordingly, shippers utilizing embodiments of a shipping service resale platform herein may fund and manage a single account and yet take advantage of rates associated with offerings traditionally requiring separate accounts and/or surcharges (e.g., a premium added to the rate by a reseller).

Figure 2:
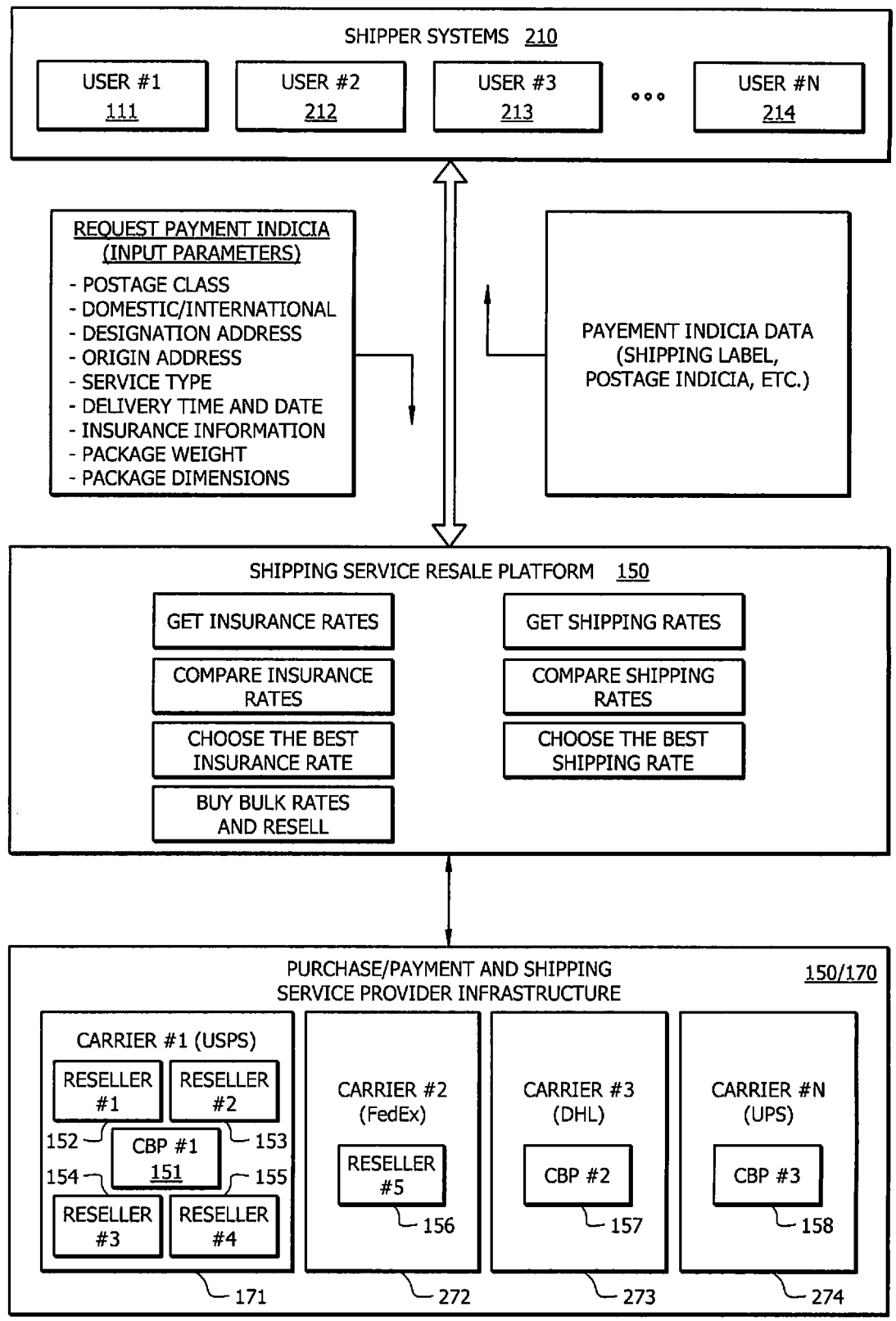
FIG. 2 shows a block diagram conceptually illustrating operation of the shipping transaction systems of FIGS. 1A and 1B to provide single shipper account access to multiple shipping service rate schedules according to embodiments of the invention.

FIG. 2 shows a block diagram conceptually illustrating operation of shipping transaction system 100 to provide single shipper account access to multiple shipping service rate schedules according to embodiments of the invention. In the diagram of FIG. 2, it is assumed that the shippers have established shipper accounts in association with shipping service resale platform 130. For example, the shippers may have provided shipper information and provided prepayment of monies to be used in payment for shipping service transactions to an operator of shipping service resale platform 130. The operator may hold such funds on account for the shippers to be debited as the shipper uses the shipping service resale platform to obtain payment indicia. The operator of shipping service resale platform 130 may use the funds for the cost of the payment indicia incurred as well as to provide a profit to the operator for providing the single shipper account access for shipping service transactions. It should be appreciated, however, that operation according to the present invention is not limited to a prepayment model. For example, an operator of shipping service resale platform 130 may maintain an account for one or more shippers whereby charges for payment indicia are maintained for post-payment by the shipper.

In operation, shipping service resale platform 130 of embodiments provides automated optimization with respect to shipping service rate selection. For example, shippers using any of shipping systems 210 (e.g., shippers utilizing shipper systems 111, 212, 213, and 214) may interface with shipping service resale platform 130 to request payment indicia (e.g., shipping service provider compliant postage indicia, shipping label, certificate of insurance, special services confirmation, etc.) as part of a requested shipping service transaction. Thus, the shipper may input various parameters, such as postage class, domestic/international, destination address, origination address, service type, requested delivery time and/or date, insurance information, package weight, package dimensions, etc., used by logic of shipping service resale platform 130 in determining an appropriate shipping service and rate for the shipping service transaction. For example, logic of shipping service resale platform 130 may analyze rate schedules and other information available from purchase infrastructure 150 and/or shipping service infrastructure 170 to determine, compare and choose best or otherwise most desirable insurance rates, determine compare and choose best or otherwise most desirable shipping rates, etc. for a particular shipping service transaction.

A shipper may not be provided any control over selection of the particular underlying rate schedule or purchase infrastructure (including the particular reseller) chosen according to embodiments of the invention. Moreover, embodiments provide selection of an optimal particular shipping service provider to perform the shipping services without control by the shipper, other than to designate shipping parameters to be met by the shipping services ultimately selected. Such combined rate table based shipping service selection provides a highly simplified, easily understood and utilized shipping service transaction solution for shippers. However, embodiments of the invention may alternatively be adapted to facilitate more control by a shipper, such as to allow designation of a particular shipping service provider or exclusion of a particular shipping service provider, while perhaps still having no shipper control over selection of the particular underlying rate schedule or purchase infrastructure (including the particular reseller).

In operation according to embodiments, logic of shipping service resale platform 130 may determine if discounted or reseller rates are applicable for a requested shipping service (e.g., for a USPS shipping service, determine whether the requested shipping service utilizes payment indicia, such as a shipping label, using hidden postage and where no special services are requested which prevent the use of hidden postage). Such a determination may provide a threshold decision to use shipping service infrastructure to minimize costs associated with providing the payment indicia for the shipping service transaction (e.g., although the rate may be the same, i.e., non-discounted, whether purchased directly from the shipping service provider or through a reseller, costs such as the cost of credit card processing may be borne by the shipping service provider when purchased directly). Where a determination is made to use shipping service infrastructure, further determinations may be made by logic of shipping service resale platform 130, such as to select particular infrastructure (e.g., a PSD appropriate to the region in which the shipper is shipping the item), according to embodiments. Where it is determined that discounted rates may be available, and thus purchase infrastructure associated with a reseller may be used, logic of shipping service resale platform may determine which particular purchase infrastructure serves shipping services meeting or most nearly meeting the shipping service parameters input by the shipper and which provides a best or most desirable rate (e.g., taking into account volume based incentives, payment indicia generation volumes, usage statistics, usage trend information, etc.). Additionally, logic of shipping service resale platform 130 may provide further determinations, such as to select particular infrastructure (e.g., a PSD appropriate to the region in which the shipper is shipping the item), as discussed above.

In accordance with embodiments of the invention, a shipper account for a shipper is provided with a combined rate table, whereby the rates presented to the shipper are agnostic with respect to the underlying reseller or shipping service provider actually facilitating the shipping service transaction. That is, such a combined rate table of embodiments establishes the rates for various shipping services for that shipper irrespective of the particular rate schedules and/or supplier, reseller, or shipping service provider payment mechanisms which may ultimately be used in association with the shipper's purchase and payment for the shipping services. Accordingly, the shipper's rating scheme is simplified from the vantage point of the shipper while, nevertheless, enabling use of different rate schedules as may be available through various shipping service provider payment mechanisms. Because such shipper accounts implemented according to embodiments of the invention are agnostic with respect to supplier, reseller, and shipping service provider payment mechanisms, logic of a shipping service resale platform may operate to dynamically (e.g., on a transaction by transaction basis) select an optimal rate and attendant payment mechanism for any shipping transaction.

In operation of shipping service resale platform 130 of embodiments herein, the shipper is charged for a shipping service transaction (e.g., the shipper's prepaid account balance may be debited or post-paid balance may be incremented) based on a rate table associated with the shipper's account while the entity operating the shipping service resale platform is charged a rate based on the rate schedule or account rate for the particular infrastructure chosen to serve the shipper's shipping service transaction request. Accordingly, logic of shipping service resale platform 130 preferably operates to select purchase infrastructure (e.g., a particular one of purchase infrastructure 151, 152, 153, 154, 155, 156, 157, or 158, and perhaps particular resources thereof, such as an appropriate PSD) and/or shipping service infrastructure (e.g., a particular one of shipping service infrastructure 171, 272, 273, or 274, and perhaps particular resources thereof, such as an appropriate PSD) for purchasing a shipping service meeting (or most nearly meeting) the parameters of the shipping service requested by the shipper and which provides a rate compatible with the rate of the shipper's rate table. For example, where the shipper's rate table provides for fixed rates, the operator of shipping service resale platform 130 may wish to find the lowest rate available through the available infrastructure (e.g., optimize the difference between the rate in the shippers' rate table and the infrastructure based rate schedule) to thereby optimize profitability for the operator. Even where the shipper's rate table provides a discount/premium schedule (e.g., a percentage off of published rates or a percentage markup over rates incurred by the operator) the operator may likewise wish to find the lowest rate available through the available infrastructure.

It should be appreciated that the analysis performed by shipping service resale platform 130 may comprise considerations in addition to or in the alternative to best rates. For example, logic of shipping service resale platform 130 may track purchases/payments made with respect to particular shipping service providers and/or resellers to determine eligibility (or progress toward eligibility) for bulk discounts or other incentives for directing shipping service transactions through one alternative rather than another alternative which may have an otherwise apparently lower rate.

In order to facilitate interactivity and cooperative operation between shipping service resale platform 130 and purchase infrastructure 150 and/or shipping service infrastructure 170 as described herein, a number of interfaces and means by which data exchange may be conducted may be provided according to embodiments. For example, application program interfaces (APIs) may be provided with respect to the links between shipping service resale platform 130 and purchase infrastructure 150 as well as between resale platform 130 and shipping service infrastructure 170 to facilitate data exchange for such functions as sign up of a new shipping service provider and/or reseller, deleting a shipping service provider and/or reseller, uploading new rate schedules (e.g., shipping rates, insurance rates, etc.) to the shipping service resale platform, communicating promotional rates to the shipping service resale platform, providing reporting, tracking, etc. data, and/or the like.

From the foregoing, it can be appreciated that shipping service rate optimization is facilitated, whereby a shipper is enabled to utilize rates available from various rate schedules, such as may include reseller negotiated rates, CBP rates, etc., for a shipper using a single shipper account of embodiments of the invention. In operation according to embodiments, the shipper's account may be isolated from the shipping service provider accounts or other payment mechanisms (e.g., PSDs), whereby resellers, third party suppliers, operators of the shipping service resale platform, etc., fund the underlying shipping service provider payment mechanisms separately from the shipper making payment for the payment indicia.

Embodiments of the invention operate to create and maintain log or tracking data as may be utilized in generating usage statistics, determining payment indicia generation volume by the various resources, providing tracking and reporting with respect to the shipping services and associated transactions, etc. For example, because there is separation between the infrastructure used to generate payment indicia for shippers log data generated according to embodiments of shipping service resale platform 130 may maintain a link between the infrastructure used in generation of the payment indicia, the payment indicia itself, and the shipper and/or shipper account for which the payment indicia was generated. Accordingly, where the payment indicia requires reprinting or reissue, credits/refunds may be applied to the proper infrastructure accounts as well as the proper shipper accounts.

Figure 3A:
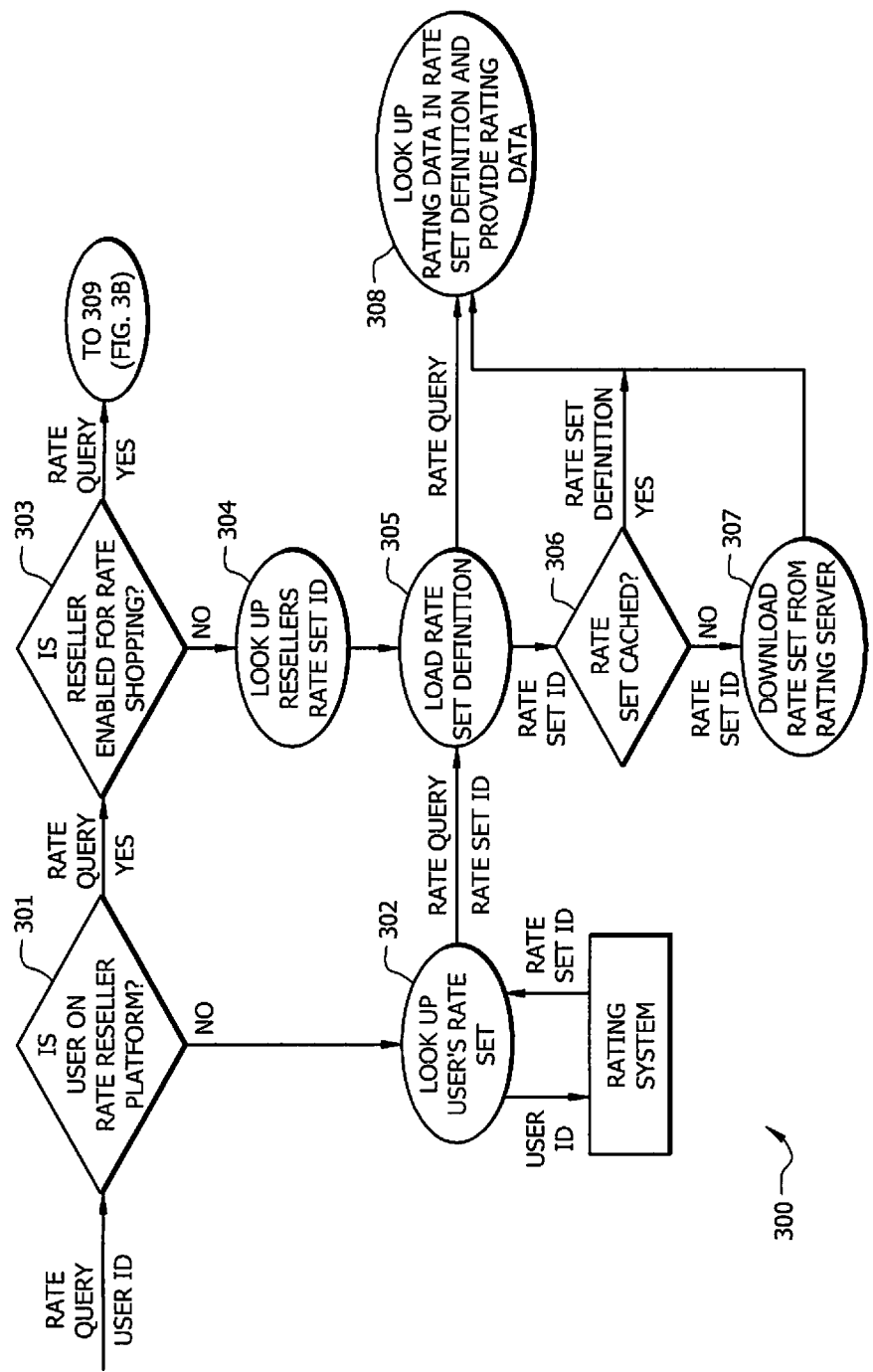
FIGS. 3A and 3B show a flow diagram of operation of a shipping transaction system to identify a best rate according to embodiments of the invention.
Figure 3B:
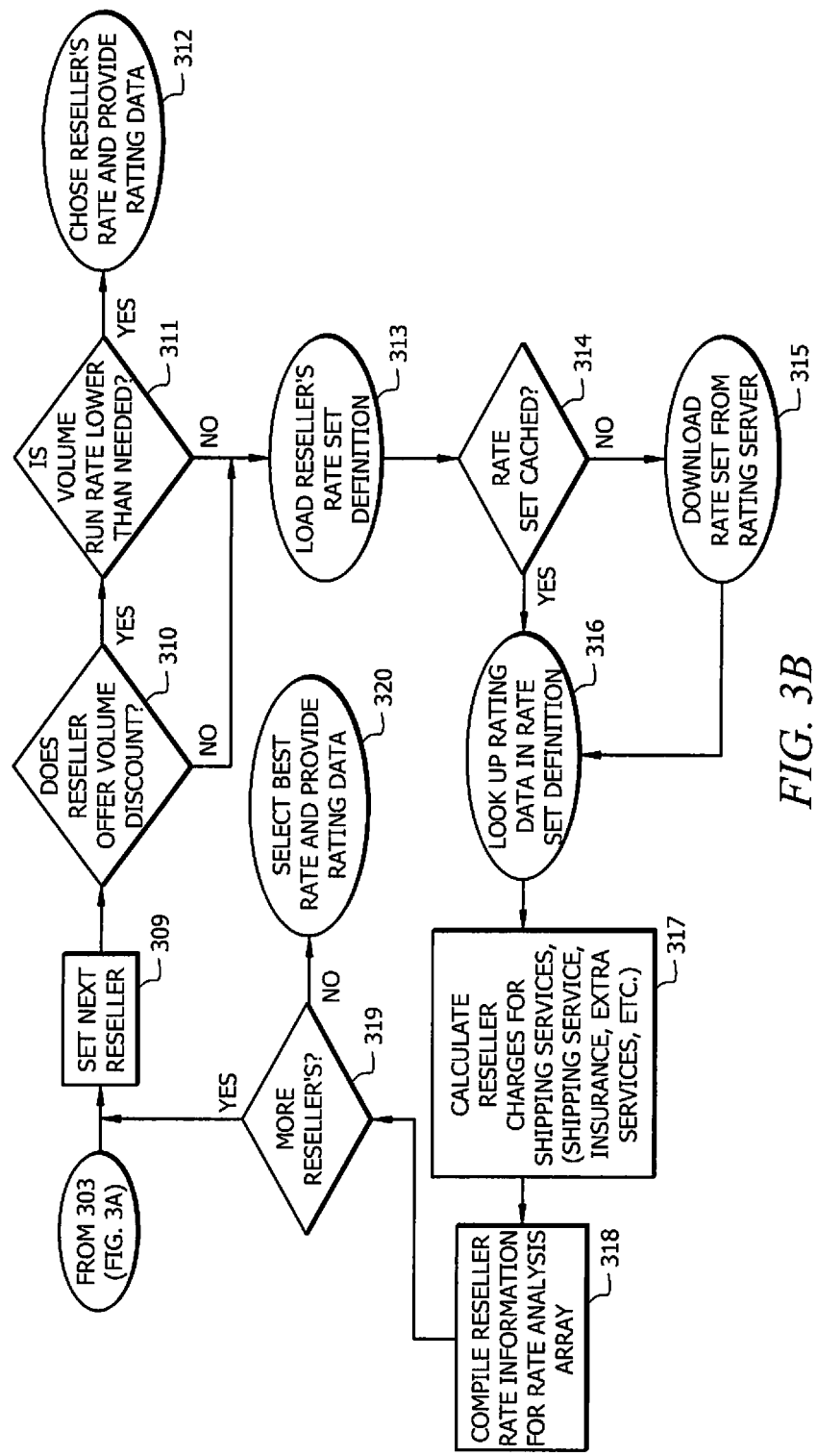
Figure 4:
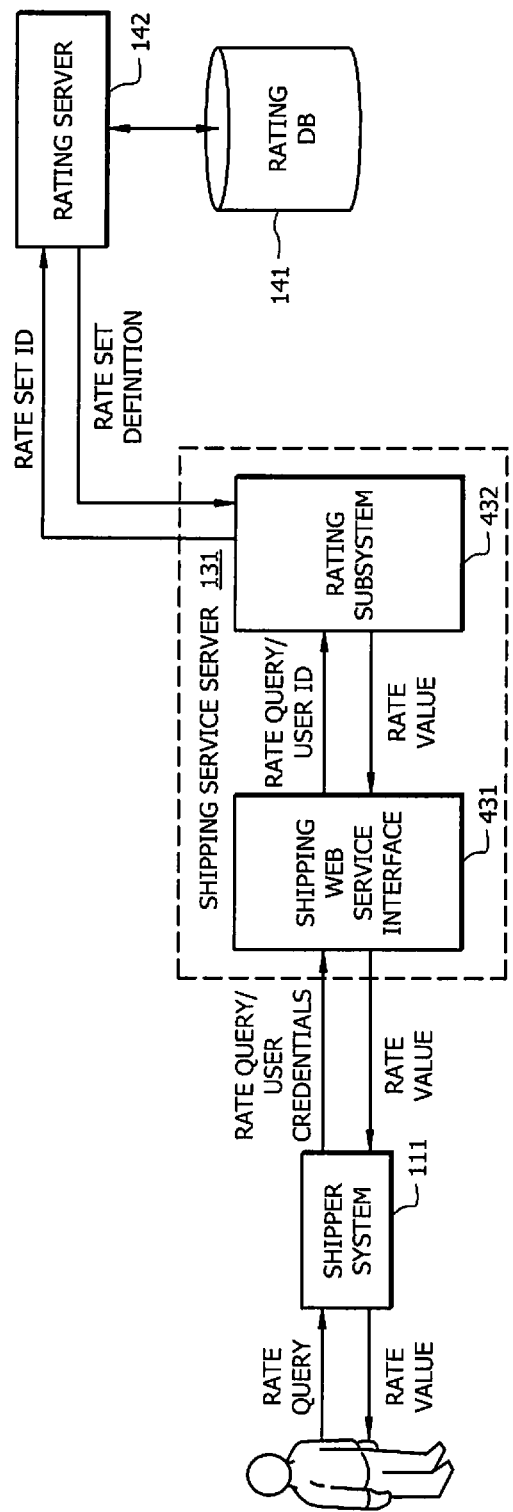
FIG. 4 shows a portion of a shipping transaction system adapted to provide best rate identification operation according to embodiments of the invention.

It should be appreciated from the foregoing that shipping transaction systems, such as shipping transaction system 100, operable according to the concepts herein may be utilized to identify a best rate with respect to any particular shipping service transaction where the shipper utilizes a shipping service single shipper account access account. The flow diagram shown in FIGS. 3A and 3B illustrates operation of shipping transaction system 100 responsive to a rate request according to embodiments of the invention. In particular, flow 300 is shown in FIGS. 3A and 3B operable with respect to a portion of shipping transaction system 100, as represented in FIG. 4, to provide rate determinations in accordance with embodiments herein.

In operation according to the illustrated embodiment, a user of shipper system 111 initiates a rate query comprising rating information (e.g., origination ZIP code and destination ZIP code, carrier/shipping service provider information, mail class, package type, package weight, physical dimensions, special handling instructions, insurance, extra services, etc.) and accompanied by the user's identification information. At block 301 a determination is made as to whether the user is utilizing a rate reseller's platform or is otherwise enabled to utilize reseller rates for shipping services. The illustrated embodiment is adapted to accommodate a variety of user scenarios, some of which access the functionality of a shipping service resale platform herein and others of which may implement a more traditional model for rate determinations.

For example, where the user is not using reseller rates (e.g., the user has not established a rate plan with one or more rate resellers and/or is not utilizing a reseller platform for a rate query) that may be determined at block 301 resulting in processing proceeding to block 302. As determined at block 301, the user is operating according to a traditional user model in which the user has a typical rate table rather than taking advantage of the rate determination features of the shipping service resale platform. Accordingly, processing according to the illustrated embodiment at block 302 provides for shipping service server 131 identifying the user's rate set (e.g., using the user's identification information) and rating server 142 is operable to retrieve the appropriate rate set identification information (e.g., using the rating information of the rate query) for use in looking up the rating data as described below with respect to blocks 305-308. For example, shipping web service interface 431 (FIG. 4) of shipping service server 131 may accept rate query information and user credentials from shipper system 111 and use that information, or some portion thereof, to interact with rating subsystem 432 to determine a rate set (e.g., determine a rate set identification) applicable to the user.

If, however, it is determined at block 301 that the user is utilizing a shipping service resale platform or is otherwise enabled to utilize reseller rates, processing according to the illustrated embodiment proceeds to block 303. At block 303 a determination is made as to whether the reseller(s) for which the user is enabled to utilize reseller rates provides for or allows the use of rate shopping as provided by the shipping service resale platform of embodiments herein. If the reseller does not allow for the use of rate shopping (e.g., the reseller utilizes a traditional reseller rate model), processing according to the illustrated embodiment proceeds to block 304 where shipping service server 131 identifies the reseller rate set applicable to the user (e.g., using the user's identification information) and rating server 142 is operable to retrieve the appropriate rate set identification information (e.g., using the rating information of the rate query). For example, shipping web service interface 431 (FIG. 4) of shipping service server 131 may accept rate query information and user credentials from shipper system 111 and use that information, or some portion thereof, to interact with rating subsystem 432 to determine a reseller rate set (e.g., determine a rate set identification) applicable to the user.

Whether the user is operating according to a model wherein reseller rates are not being used (e.g. processing proceeding from block 302) or according to a reseller rate model which does not utilize rate shopping (e.g., processing proceeding from block 304), processing according to the illustrated embodiment proceeds to block 305 wherein the rate set definition applicable to the user is loaded. In processing at block 305 of the illustrated embodiment, the rate query information or some portion thereof is passed for use in looking up rating data at block 308. Processing, however, proceeds to block 306 wherein a determination is made as to whether the appropriate rate set is available at rating subsystem 131. For example, the rate set may have been cached in association with use of the rate set by the user or another user. If the rate set is not available, processing according to the illustrated embodiment proceeds to block 307 where the appropriate rate set is downloaded from the rating server. For example, rating subsystem 432 (FIG. 4) may utilize the rate set identification information to interact with rating server 142 to obtain the appropriate rating information from rating database 141.

Having the rate set information (e.g., whether it was determined that the appropriate rate set was available at the rating subsystem at block 306 or the rate set was downloaded from the rating server at block 307), processing according to the illustrated embodiment proceeds to block 308 wherein the applicable rate data is looked up in the rate set definition using the rate query information, or some portion thereof. The applicable rate may be provided by rating subsystem 432 to shipping web service interface 431 for providing to shipper system 111 and use by the user.

If, however, it is determined at block 303 that the reseller(s) for which the user is enabled to utilize reseller rates provides for or allows the use of rate shopping as provided by the shipping service resale platform of embodiments herein, processing according to the illustrated embodiment proceeds to block 309 for operation to find a best rate applicable to the user for the particular shipping service of the rate query. At block 309 the next reseller for which rating is enabled for the user is set. Thereafter, processing to find a best rate according to the illustrated embodiment proceeds to block 310.

At block 310 a determination is made as to whether the reseller offers a volume discount. As previously described, logic of shipping service resale platform 130 may track purchases/payments made with respect to particular shipping service providers and/or resellers to determine eligibility (or progress toward eligibility) for bulk discounts or other incentives for directing shipping service transactions through one alternative rather than another alternative which may have an otherwise apparently lower rate. Accordingly, processing at block 310 may be utilized for coordinating advancement toward eligibility for bulk discounts or other incentives. For example, if it is determined that the reseller offers volume discounts, processing according to the illustrated embodiment proceeds to block 311 where a determination is made regarding the volume run rate (i.e., progress toward an incentive goal). In operation according to the illustrated embodiment, if it is determined that the volume run rate is lower than needed, processing proceeds to block 312 where the reseller's rate is chosen for the shipping service and the rating data provided to the user (e.g., the applicable rate data is looked up in the rate set definition using the rate query information, or some portion thereof, and the applicable rate may be provided by rating subsystem 432 to shipping web service interface 431 for providing to shipper system 111 and use by the user). Accordingly, the run rate associated with the reseller is increased for advancing toward the volume discount.

If, however, it is determined that the reseller does not offer a volume discount (block 310) or that the run rate is already sufficient to achieve eligibility (block 311) processing according to the illustrated embodiment proceeds to block 313. Blocks 313, 314, 315, and 316 of the illustrated embodiment operate to retrieve or otherwise access the reseller's rating data, as discussed above with reference to blocks 305, 306, 307, and 308. However, as the rating data is being used in determining a best rate, processing at block 316 proceeds to provide the rating data for further calculation, compilation, and/or analysis by rating subsystem 432. It should be appreciated that the rating data for any particular reseller or other entity may comprise rating information for base shipping services (e.g., transport, handling, and/or delivery of a shipped item) as well as rates for associated services, such as insurance rates and extra service rates (e.g., registered mail, electronic return receipt, certified mail, hold mail pickup, etc.).

At block 317 the rating data may be utilized to calculate the reseller's charges for the shipping services associated with the rate query. For example, the basic shipping service rate, the insurance rate for the reseller, and extra service rates (e.g., special handling, additional services, etc.) for the reseller may be utilized to calculate a total cost for the shipping service in accordance with the reseller's applicable rates.

Thereafter, at block 318, the rate information may be utilized to compile reseller rate information in a rate analysis array used to identify a best rate. As previously described, in operation of shipping service resale platform 130 of embodiments herein, the shipper is charged for a shipping service transaction based on a rate table associated with the shipper's account while the entity operating the shipping service resale platform is charged a rate based on the rate schedule or account rate for the particular infrastructure chosen to serve the shipper's shipping service transaction request.

Accordingly, logic of rating subsystem 432 may operate to select a reseller, and thus utilize the corresponding purchase infrastructure, for purchasing a shipping service which provides a rate compatible with the rate of the shipper's rate table. Accordingly, operation in accordance with block 318 of the illustrated embodiment compiles the appropriate information for use in selecting a particular reseller in a rate analysis array of rating subsystem 432.

For example, where the shipper's rate table provides for fixed rates, the operator of shipping service resale platform 130 may wish to find the lowest rate available through the available resellers whereby the difference between the rate in the shippers' rate table and the reseller's charges for the shipping service is optimized. Accordingly, logic of rating subsystem 432 may make a net profit calculation based upon the user's rate from the shipper's rate table and the total cost for the shipping service as offered by the reseller (i.e., Net Profit=User's Rate−Total Cost) at block 318. This information may be stored in the rate analysis array, perhaps along with other information such as the reseller identification information, for comparison and analysis with other reseller rate information.

Processing according to the illustrated embodiment proceeds to block 319 wherein a determination is made as to whether there are additional resellers for rating analysis. If another reseller is available with respect to the user, processing according to the illustrated embodiment returns to block 309 for operation, as described above, with respect to this next reseller. If, however, there are no additional resellers for rating analysis, processing according to the illustrated embodiment proceeds to block 320 where a reseller's rate is chosen for the shipping service and the rating data provided to the user. For example, logic of rating subsystem 432 may analyze the information within the aforementioned rate analysis array to identify a greatest net profit and select that reseller (e.g., using the reseller identification information stored in association with the rating information within the rate analysis array) for providing the shipping service. In operation according to embodiments, the applicable rate data for the selected reseller is looked up in the rate set definition using the rate query information, or some portion thereof and provided by rating subsystem 432 to shipping web service interface 431 for providing to shipper system 111 and use by the user.

Figure 5:
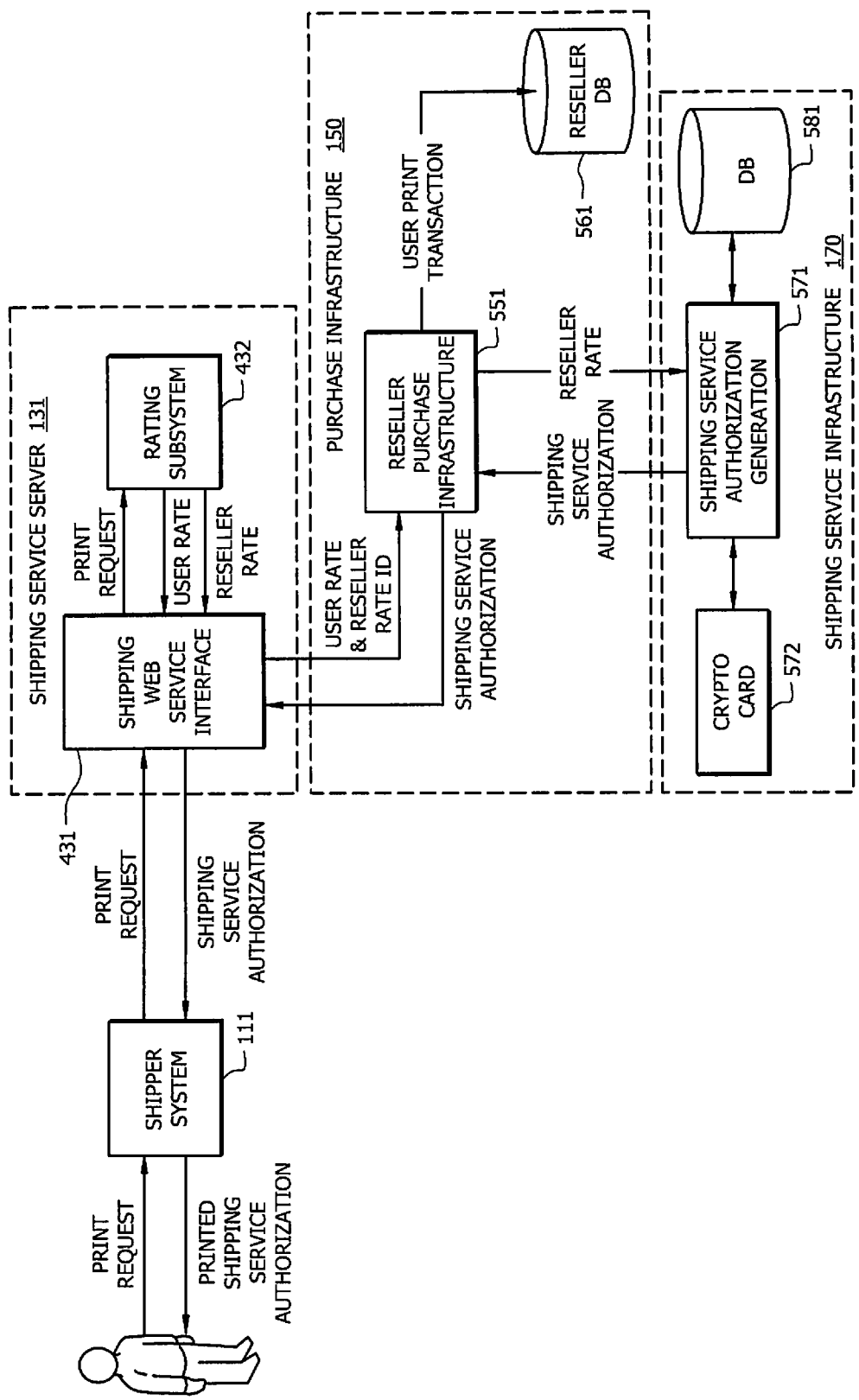
FIG. 5 shows a portion of a shipping transaction system adapted to provide shipping service authorization printing operation according to embodiments of the invention.

Having described operation to provide rating information, including identification of a best rate, in response to a rate query above, embodiments providing operation to print shipping service authorization documentation will be described with reference to FIG. 5. In particular, FIG. 5 shows a portion of shipping transaction system 100 operable to provide shipping service authorization printing in accordance with embodiments herein. The shipping service authorizations printed according to embodiments herein may comprise value bearing indicia (e.g., postage indicia), shipping labels, bills of lading, waybills, etc. In operation, a user controls shipper system 111 to interact with shipping service server 131 to invoke a print request. For example, a request to print shipping service authorization (e.g., a postage indicum), preferably including user identification information and information regarding the applicable rates (e.g., as provided through operation of flow 300 described above) may be provided to shipping web service interface 431. Shipping web service interface 431 may interact with rating subsystem 432 to obtain user rate information and reseller rate information. This information may be provided by shipping web service interface 431 to the reseller infrastructure of purchase infrastructure for the appropriate reseller for obtaining the desired shipping service authorization. For example, reseller purchase infrastructure 551 of the illustrated embodiment may correspond to a particular one of purchase infrastructure 152, 153, 154, and 155 associated with a reseller selected for the shipping service transaction. Thus, reseller purchase infrastructure 551 may operate as described above to provide an interface for generating payment indicia using reseller negotiated rate schedules.

Reseller purchase infrastructure 551 of the illustrated embodiment interacts with shipping service infrastructure 170 to obtain the desired shipping service authorization. For example, reseller purchase infrastructure 551 may interface with shipping service authorization generation logic 571 of shipping service infrastructure 571 for generating the desired shipping service authorization. Shipping service authorization generation logic 571 may comprise logic of shipping service provider server 171 (FIGS. 1A and 1B) operable to perform shipping service transactions in cooperation with purchase infrastructure 150. Authorization generation logic 571 may be operated to generate shipping service authorization, such as may comprise value bearing indicia, and may thus use information provided by database 581 (e.g., PSD records) and/or cryptographic operations as provided by cryptocard 572. For example, shipping service authorization generation may use virtual PSDs stored by database 581 which may be loaded into cryptocard 572 for generation of shipping service authorization to be printed and used in shipping service transactions.

The shipping service authorization generated by shipping service infrastructure 170 is provided to purchase infrastructure 150 for providing to shipper system 111 via shipping service server 131. Moreover, in operation according to embodiments of the invention, purchase infrastructure 150 keeps records of the user shipping service authorization print transaction, such as for reseller reconciliation, volume purchase data tracking, etc. Accordingly, reseller purchase infrastructure 551 of the illustrated embodiment provides user print transaction information to reseller database 561 for storing such information.

Having received the generated shipping service authorization from shipping web service interface 431, shipper system 111 may thereafter print the shipping service authorization. For example shipper system 111 may operate to print postage indicia, acceptable to a shipping service provider as proof of payment for shipping services, upon labels, packages, envelopes, etc. Similarly, shipper system 111 may print shipping labels, which are acceptable to a shipping service provider for use in providing shipping services, upon sheet stock, packages, etc.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system comprising:
    a shipper account database having a plurality of shipper accounts each configured to provide single shipper account access to multiple shipping service rate schedules for purchase of payment indicia in association with shipping service transactions; and
    a shipping service server configured to provide a shipper system interface for shipper system access in conducting the shipping service transactions and to analyze shipping service request parameters of a shipper's requested shipping transaction and to select particular purchase infrastructure of purchase infrastructures for use in purchasing the payment indicia for the requested shipping transaction, wherein the purchase infrastructures comprise a plurality of different payment indicia purchase mechanisms to which access is provided for the plurality of shipper accounts by the shipping service server.

2. The system of claim 1, wherein the payment indicia comprises a payment indicia acceptable by a shipping service provider for payment processing selected from the group consisting of a shipping label, a postage indicia, a shipping manifest, and a bill of lading.

3. The system of claim 1, wherein the plurality of shipper accounts comprise account balances of prepayments to an operator of the shipping service server that have not been deposited into accounts of the purchase infrastructures.

4. The system of claim 3, wherein the accounts of the purchase infrastructures comprise one or more account balance maintained in a postage security device (PSD).

5. The system of claim 3, wherein the plurality of shipper accounts further comprise account balances of post-payments due to an operator of the shipping service server for purchases made against accounts of the purchase infrastructures.

6. The system of claim 1, wherein the multiple shipping service rate schedules comprise a commercial based pricing (CBP) rate schedule and a reseller negotiated rate schedule.

7. The system of claim 1, wherein the multiple shipping service rate schedules comprise a plurality of reseller negotiated rate schedules.

8. The system of claim 1, wherein the multiple shipping service rate schedules comprise rate schedules for a plurality of different shipping service providers.

9. The system of claim 1, further comprising:
    a shipper rate table database providing a plurality shipper rate tables corresponding to the plurality of shipper accounts; and
    a purchase infrastructure rate schedule database providing the shipping service rate schedules, wherein the shipping service server is further configured to analyze an appropriate one of the shipper rate tables and appropriate ones of the shipping service rate schedules to select the particular purchase infrastructure for use in purchasing the payment indicia.

10. A method for conducting shipping service transactions, the method comprising:
    receiving, by a shipping service server from a shipper, shipping service request parameters in association with a requested shipping transaction from the shipper;
    analyzing, by the shipping service server using a plurality of shipper accounts each configured to provide single shipper account access to multiple shipping service rate schedules for purchase of payment indicia in association with shipping service transactions, the shipping service request parameters of the shipper's requested shipping transaction, wherein the shipping service server is configured to provide a shipper system interface for shipper system access in conducting the shipping service transactions; and selecting, by the shipping service server, particular purchase infrastructure of purchase infrastructures for use in purchasing payment indicia for the requested shipping transaction based on the analyzing the shipping service request parameters of the shipper's requested shipping transaction, wherein the purchase infrastructures comprise a plurality of different payment indicia purchase mechanisms to which access is provided for the plurality of shipper accounts by the shipping service server.

11. The method of claim 10, wherein the payment indicia comprises a payment indicia acceptable by a shipping service provider for payment processing selected from the group consisting of a shipping label, a postage indicia, a shipping manifest, and a bill of lading.

12. The method of claim 10, wherein the plurality of shipper accounts comprise account balances of prepayments to an operator of the shipping service server that have not been deposited into accounts of the purchase infrastructures.

13. The method of claim 12, wherein the accounts of the purchase infrastructures comprise one or more account balance maintained in a postage security device (PSD).

14. The method of claim 12, wherein the plurality of shipper accounts further comprise account balances of post-payments due to an operator of the shipping service server for purchases made against accounts of the purchase infrastructures.

15. The method of claim 10, wherein the multiple shipping service rate schedules comprise a commercial based pricing (CBP) rate schedule and a reseller negotiated rate schedule.

16. The method of claim 10, wherein the multiple shipping service rate schedules comprise a plurality of reseller negotiated rate schedules.

17. The method of claim 10, wherein the multiple shipping service rate schedules comprise rate schedules for a plurality of different shipping service providers.

* * * * *